United States Patent [19]
Sato et al.

[11] Patent Number: 4,593,868
[45] Date of Patent: Jun. 10, 1986

[54] REEL SPRING OF MAGNETIC TAPE CASSETTE

[75] Inventors: Takateru Sato; Haruo Shiba, both of Tokyo, Japan

[73] Assignee: TDK Electronics Company, Ltd., Tokyo, Japan

[21] Appl. No.: 540,713

[22] Filed: Oct. 13, 1983

Related U.S. Application Data
[63] Continuation of Ser. No. 323,079, Nov. 19, 1981.

[30] Foreign Application Priority Data

Jan. 14, 1981 [JP]  Japan .................................. 56-2837

[51] Int. Cl.⁴ .............................................. G11B 23/10
[52] U.S. Cl. ...................................... 242/199; 29/416
[58] Field of Search ................. 242/198, 199; 29/173, 29/416, 417; 360/132, 92, 93, 96

[56] References Cited
U.S. PATENT DOCUMENTS

| 1,639,593 | 8/1927 | Dean .................... 29/417 X |
| 3,037,271 | 6/1962 | Schilberg ............... 29/416 X |
| 3,164,038 | 1/1965 | Ahlbin .................. 29/416 X |
| 4,128,216 | 12/1978 | Hioki .................... 242/199 |

FOREIGN PATENT DOCUMENTS

| 0030367 | 6/1981 | European Pat. Off. ........... 242/199 |
| 42385 | 3/1980 | Japan .................... 242/199 |

Primary Examiner—Harvey C. Hornsby
Attorney, Agent, or Firm—Oblon, Fisher, Spivak, McClelland & Maier

[57] ABSTRACT

A reel spring for a magnetic tape cassette is made of a resilient sheet metal into a diamond-like configuration in which a pair of portions which are asymmetrical with reference to two central axial line perpendicularly crossing and are symmetrical with reference to the crossing point are removed.

2 Claims, 7 Drawing Figures

REEL SPRING OF MAGNETIC TAPE CASSETTE

This application is a continuation of application Ser. No. 323,079, filed Nov. 19, 1981.

BACKGROUND OF THE INVENTION

1. Field of the Invention

The present invention relates to a magnetic tape cassette. More particularly, it relates to a reel spring used in a video tape cassette.

2. Description of the Prior Art

FIGS. 1 and 2 illustrate the conventional video tape cassette wherein a reel spring having a substantially diamond-like configuration is held inside the upper half casing (1) of the tape cassette. When a reel (4) with a magnetic tape (3) is put into the tape cassette, the reel (4) is pressed on a lower casing (5) by the reel spring (2) so that the reels can move within a limited range. FIG. 2 illustrates the reel (4) pressed down by the reel spring in a fragmentary sectional view.

FIG. 3 (A) illustrates in more detail the reel spring (2) wherein it is formed by stamping a resilient sheet metal such a manner that a pair of rectangular portions are removed from both side with reference to the short diagonal line of the substantially diamond-like configuration. However, when the reel spring having such a shape is stamped from a strip metal, a great amount of material loss results as is clear from FIG. 3 (B) and the number of the reel springs stamped from a given area of the material is limited.

SUMMARY OF THE INVENTION

It is an object of the present invention to overcome the disadvantage of the conventional reel spring.

It is another object of the present invention to provide a reel spring for a tape cassette which allows the production of a greater number of reel springs from a given area of a sheet metal thereby minimizing material loss while retaining the same function as the conventional reel spring.

The foregoing and the other object of the present invention have been attained by providng a reel spring for a tape cassette which is formed by cutting off the asymmetrical half portions from the left and right half portions of a substantially diamond-like configuration, while remaining the apex portions, so as to be asymmetrical with reference to two central axial lines perpendicularly crossing each other and to be symmetricl with reference to the crossing point.

BRIEF DESCRIPTION OF DRAWINGS

FIG. 3 (B) is a plan view of the reel springs showing how they are stamped from a metal sheet;

FIG. 4 (B) is a plan view of an embodiment of the reel spring to be stamped from a metal sheet.

DETAILED DESCRIPTION OF A PREFERRED EMBODIMENT

Figure 1:
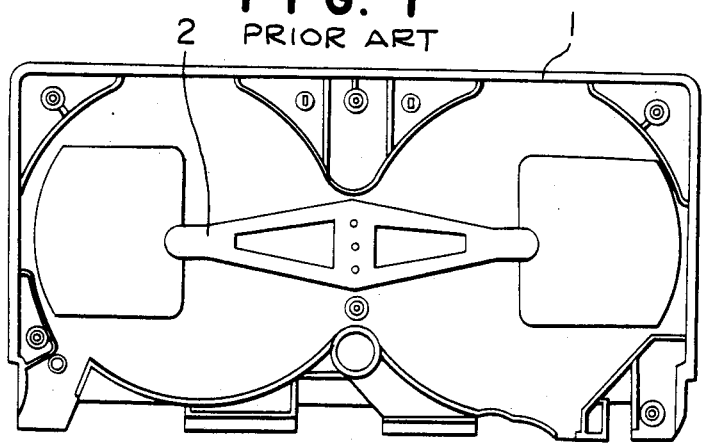
FIG. 1 is a front view of the inside of the upper half casing of the conventional video tape cassette.
Figure 2:
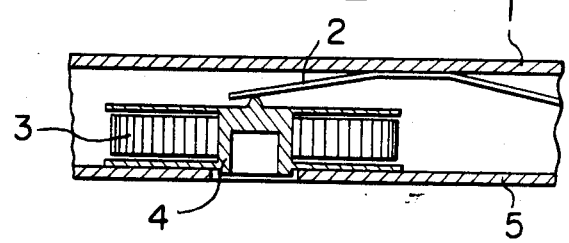
FIG. 2 is a fragmentally sectional view of the tape cassette in FIG. 1 in which the operating state of a reel spring is illustrated.
Figure 5:
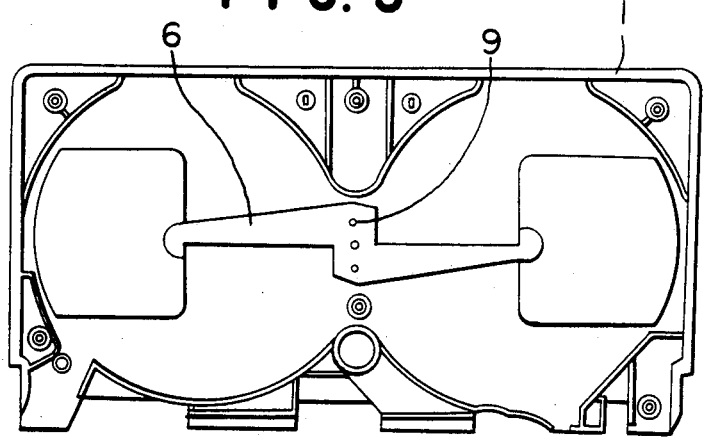
FIG. 5 is a plan view of an embodiment of the reel spring held in the upper half casing of a tape cassette.
Figure 3A:
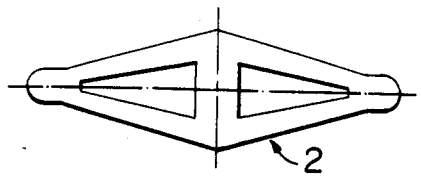
FIG. 3 (A) is a plan view of a reel spring used in the tape cassette shown in FIG. 1.
Figure 4A:
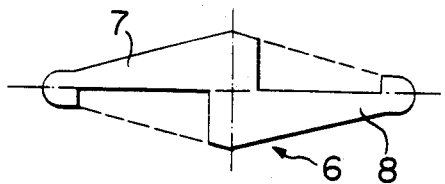
FIG. 4 (A) is a plan view of an embodiment of the reel spring of the present invention.
Figure 3B:
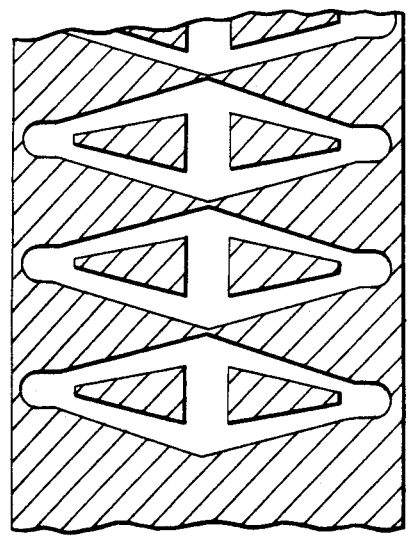
Figure 4B:
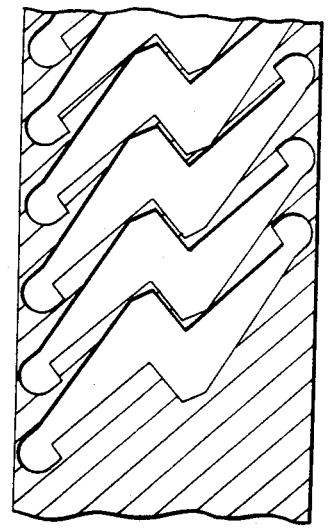

An embodiment of the reel spring for magnetic tape cassette will be described with reference to drawings. FIG. 4 (A) illustrates an embodiment of the reel spring of the present invention. The shape of the reel spring (6) is substantially in diamond-like in view of supplement of lacked portions shown by dotted lines. Accordingly, the final shape can be considered to be a shape formed by removing a pair of portions from two pairs of portions defined by two diagonal lines of the diamond-like configuration. In other words, the shape can be obtained by cutting off the asymmetrical half portions from left and right portions of a diamond-like configuration wherein portions (7) and (8) are asymmetrical with reference to each diagonal line which perpendicularly crosses i.e. central axial lines and are symmetrical with reference to the central point formed by the crossing lines.

FIG. 4 (b) illustrates an embodiment of stamping of the reel spring showing a shape described above. The shape allows stamping of twice the reel springs as the conventional reel spring when the same area of metal sheet is used, thus minimizing material loss.

In a preferred embodiment, the ratio of the long diagonal line to the short diagonal line is in the range between 1:0.2 to 0.35 and the ratio of the removed area to the remaining area of the reel spring is in the range between 1:0.5 to 0.8.

The reel spring shown in FIG. 4 can be held inside the upper half casing of a tape cassette by utilizing small holes formed in the middle portion of the reel spring as in the conventional reel spring. The reel spring (6) once fitted to the upper half casing uniformly pushes reels placed on the lower half casing when the upper half casing is fitted to the lower half casing. The function of the reel spring of the present invention is completely the same as that of the conventional reel spring.

As described above, in accordance with a reel spring of the present invention, more greater number of reel springs can be stamped from the same metal sheet thereby greatly reducing material loss while retaining the pressing function to the reels the same as the conventional reel spring.

We claim:

1. In a magnetic tape cassette, a reel spring made of stamped resilient sheet metal, said reel spring defining, with respect to transverse first and second axial lines crossing at a crossing point, a shape comprising:

an elongated parallelogram having a shorter diagonal coincident with said first axial line and a longer diagonal coincident with said second axial line, whereby said parallelogram is divided into four quadrants by said axial lines;

a first cut-out in said parallelogram, said first cut-out formed in a first said quadrant, said first cut-out extending from the peripheral surface of said parallelogram to at least said second axial line, whereby said first quadrant has an indented shape; and a second cut-out in said parallelogram, said second cut-out formed in a second said quadrant, said second quadrant being opposite said crossing point from said first quadrant, said second cut-out extending from the peripheral surface of said parallelogram to at least said second axial line, whereby said second quadrant has an indented shape, whereby said first and second cut-outs are asymmetric with respect to both said axial lines and are symmetric with respect to said crossing point.

2. The magnetic tape cassette having the reel spring of claim 1 wherein said first and second cut-outs each define a first edge colinear with said second axial line and two second edges intersecting said first edge at right angles, and wherein said reel spring is fixed to said cassette along said first axial line.

* * * * *